Patented July 25, 1939

2,167,556

UNITED STATES PATENT OFFICE 2,167,556

RECOVERY OF LIGNIN FROM NATURAL CELLULOSE COMPOUNDS

Judson G. Smull, Bethlehem, Pa., assignor, by mesne assignments, to Stacom Process Corporation, Long Island City, N. Y., a corporation of New York No Drawing. Application March 18, 1936, Serial No. 69,530

8 Claims. (Cl. 260—124)

This invention relates generally to the preparation of fibrous vegetable materials for use in paper making and other commercial processes in the art.

With such object in view the process comprises broadly a new and simple method of purifying the cellulose constituents of such materials, i. e., the separation from the cellulose of enough of the other constituents of vegetation, particularly lignin, to render the residue suitable for paper making and similar purposes, or at least to such an extent as will substantially shorten and cheapen the work now done by other processes to which in some cases the cellulose may be submitted for complete purification after treatment by my process.

An important, and I believe novel, feature of my process is the efficient and cheap isolation of the lignin, or of a large part thereof, in pure form ready for use in the arts without substantial further treatment. The lignin so isolated I believe to be a valuable by-product as it is usable in making plastics, yields wood alcohol, wood creosote, tar and acetic acid when destructively distilled, and if obtainable in sufficient quantities at a low cost might find many other commercial uses. At present it is thrown away in the waste liquor of the sulphite process commonly used in paper making, being difficult of recovery therefrom.

Lignin is not substantially fibrous in structure and while its exact chemical structure has not been authoritatively determined, the two forms best known have been given the empirical formulae $C_{40}H_{42}O_{13}$ for alpha lignin, and $C_{40}H_{44}O_{12}$ for beta lignin. The presence of three per cent by weight of it in cellulose pulp renders the latter unfit for use in making paper, rayon, Cellophane and similar cellulose products. It constitutes about 35% by weight of a cornstalk and about 46% of such vegetation after thorough washing with water and complete dehydration thereof.

So far as I am at present advised lignin has not heretofore been isolated and recovered in useful form during the operation of any of the processes employed commercially for the purification of the cellulose in wood, cornstalks, straw, sugar cane and similar forms of vegetation, but has gone into the waste products of such processes along with others of the original constituents from which the resultant pulp must be freed to make good paper or other cellulose products.

I have found, however, that if the properly ground or comminuted vegetable fiber is mixed with liquid sulphur dioxide ($SO_2$) and such mixture filtered a large proportion, at least, of the lignin in the vegetation goes into the original solution, and if the $SO_2$ solution so formed is thereafter passed through ordinary filter paper or other filtering septum and evaporated lignin is left as a solid residue.

Obviously the residue which has been caught by the filtering septum is mainly cellulose purified to the extent of the non-cellular matter dissolved out of it by the liquid $SO_2$ and to that extent such residue is advanced along any complete purification process to be followed in preparing it for use in the arts.

The two varieties of lignin so far recognized and known respectively as alpha lignin and beta lignin are soluble to different degrees in various known solvents. If it should develop that pure liquid $SO_2$ dissolves only one variety of lignin the addition of a solvent for the other which is miscible in the liquid $SO_2$ would complete the extraction of all the lignins so far known. Heretofore the known laboratory methods of isolating lignin have involved the use of alkalies or of strong mineral acids such as 72% sulphuric acid ($H_2SO_4$). So far as I am aware the use of liquid $SO_2$ has never before been proposed, nor the fact that lignin is soluble in it, realized.

Some of the commercial advantages of my invention or discovery result from the fact that liquid sulphur dioxide, which vaporizes at about 15 to 18 degrees Fahr. (minus 10 to minus 8 Cent.) is obtainable in large quantities at a reasonable cost in all civilized countries, being extensively used in mechanical refrigeration; that all of it used in my process can be recovered in pure condition by mechanical compression of the vapors liberated at room temperatures. Also machinery for such reliquefaction of the $SO_2$ vapors is common in the refrigerating art and obtainable at reasonable prices.

As an example of the process which may be carried out in a laboratory. I may take as raw material cornstalks which have been ground to a fineness of 60 mesh and subjected to a water extraction process to remove the contained sugar and water soluble substances, filtered, washed thoroughly and dried. The material so prepared is mixed with about two to three times its weight in liquid $SO_2$ in a Dewar flask or other receptable which will maintain the mixture at a temperature below the evaporation point of the $SO_2$ at atmospheric pressures. Such mixture may be agitated in any convenient way from time to time to an extent to render it uniform and to facilitate solution of the soluble constituents of the original materials. After about two hours of such treatment, the mixture should be then filtered through a Buchner funnel which is surrounded by a melting mass of ice and salt, or otherwise kept cold enough to retain the $SO_2$ in liquid form, and the filtered solution later allowed to evaporate at room temperature. The solid residue will be found to respond affirmatively to all the standard laboratory tests for lignin, such as adding caustic soda which will dissolve lignin, acidifying the solution so formed with dilute hydrochloric acid (HCl) and boiling it to reprecipitate the lignin.

Grinding or otherwise reducing the cornstalks or other raw material to a finer mesh would doubtless heighten the degree of extraction of the lignin. As at present advised I prefer to use material which has been passed through the particular type of crushing rolls described in the co-pending application of Earle F. Allen, Ser. No. 17,050, filed April 18, 1935, in which it can be subjected to sufficient pressure to break down the cells of the cellulose constituent.

There are other constituents of vegetable cellulose kown as pentosans, and whether some of these are or may be dissolved by the liquid $SO_2$ I have not yet determined. The pentosans constitute about 28% of the raw constalks. If they are not soluble in $SO_2$ the use of some of the known solvents for them such as a dilute sodium hydroxide solution, or (still better) some reagent such as acetamide which may be miscible with the liquid $SO_2$, may further increase the efficiency of my process. Washing with water also helps to remove the pentosans. Besides lignin and pentosans there are some other non-cellular constituents of vegetation, all being included in the term "hemicelluloses".

I am aware that $SO_2$ has heretofore been used as a solvent for the aromatic hydrocarbons and diolefins occurring in the output of certain petroleum oil wells and being objectionable. Relatively small quantities of these hydrocarbons may be extracted from the raw oil by use of liquid $SO_2$ the aliphatic and naphthene hydrocarbons being almost completely insoluble therein Having described my invention, I claim:

1. A method for recovering lignin from vegetable material containing it and substantially free from resin, comprising treating the said vegetable material with liquid sulfur dioxide, filtering the liquid mixture and evaporating the sulfur dioxide to leave the lignin as a solid residue.

2. A method as defined in claim 1 in which the treatment of the vegetable material with sulfur dioxide and the filtering of the liquid mixture are carried out at temperatures below the boiling point of sulfur dioxide at atmospheric pressures.

3. A method for separating lignin from vegetable material containing it, comprising compressing the material to expel substantial quantities of liquid therefrom and thereafter mixing the said material in finely divided form with liquid sulfur dioxide, separating the liquids from the solids and evaporating the sulfur dioxide from the liquid portion.

4. A method as defined in claim 3 in which the liquid sulfur dioxide is maintained at a temperature below its boiling point while separating the lignin from the cellulose in the vegetable material.

5. A method for treating vegetable material comprising compressing the material to expel substantial quantities of liquid and resinous material therefrom and thereafter mixing the said material in finely divided form with liquid sulfur dioxide, separating the liquid fraction from the solid fraction and evaporating the sulfur dioxide from the liquid fraction.

6. A method for recovering lignin from vegetable material containing it and substantially free from resin, comprising comminuting the said vegetable material and treating it with liquid sulphur dioxide, filtering the liquid mixture and evaporating the sulphur dioxide to leave the lignin as a solid residue.

7. A method for recovering lignin from corn stalks comprising comminuting the corn stalks and treating the comminuted product with liquid sulphur dioxide, filtering the liquid mixture and evaporating the sulphur dioxide to leave the lignin as a solid residue.

8. A method as defined in claim 3 in which the vegetable material treated is corn stalks.

JUDSON G. SMULL.